US012510978B2

(12) United States Patent
Langelaan et al.

(10) Patent No.: US 12,510,978 B2
(45) Date of Patent: Dec. 30, 2025

(54) USER INPUT DEVICE AND METHOD FOR OPERATION THE SAME

(71) Applicant: Wooting Technologies B.V., LV Ermelo (NL)

(72) Inventors: Johannes Jacobus Maria Langelaan, LV Ermelo (NL); Calder Nicolaas Limmen, LV Ermelo (NL); Erik Arnoldus Wilhelmus Stakenborg, LV Ermelo (NL)

(73) Assignee: Wooting Technologis B.V., LV Ermelo (NL)

( * ) Notice: Subject to any disclaimer, the term of this patent is extended or adjusted under 35 U.S.C. 154(b) by 0 days.

(21) Appl. No.: 18/601,611

(22) Filed: Mar. 11, 2024

(65) Prior Publication Data
US 2024/0353936 A1 Oct. 24, 2024

(30) Foreign Application Priority Data

Apr. 21, 2023 (NL) ...................................... 2034659

(51) Int. Cl.
*G06F 3/023* (2006.01)
*A63F 13/40* (2014.01)

(52) U.S. Cl.
CPC .............. *G06F 3/023* (2013.01); *A63F 13/40* (2014.09)

(58) Field of Classification Search
CPC ................................. G06F 3/023; A63F 13/40
See application file for complete search history.

(56) References Cited

U.S. PATENT DOCUMENTS

| 2003/0208324 A1 | 11/2003 | Bellwood et al. |
| 2011/0025606 A1 | 2/2011 | Chvojcsek et al. |
| 2021/0379487 A1* | 12/2021 | Huffer .................... A63F 13/24 |
| 2024/0061525 A1* | 2/2024 | Iimure .................. H01H 13/00 |

FOREIGN PATENT DOCUMENTS

WO 2020081943 A1 4/2020

OTHER PUBLICATIONS

Search Report for corresponding Netherlands Appl. No. 2034659 dated Oct. 13, 2023, 9 pages, no English translation.
Anonymous: "SOCD Resolutions on Smash Box—Hit Box Arcade", 4 pages, downloaded on Mar. 10, 2024, https://www.hitboxarcade.com/blogs/smash-box/socd-resolutions-on-smash-box.

* cited by examiner

*Primary Examiner* — Benjamin C Lee
*Assistant Examiner* — Nathan P Brittingham
(74) *Attorney, Agent, or Firm* — Farber LLC

(57) ABSTRACT

The invention relates to a user input comprising, a first and second input element, an output and processing means. The processing means determines for at least one of the input elements whether it is activated based on its degree of operation, and provides an output signal at the output corresponding to the determined activation. The determination for one of the input elements is based also on the degree of operation of the other input element. The invention also relates to a method comprising these steps.

14 Claims, 2 Drawing Sheets

USER INPUT DEVICE AND METHOD FOR OPERATION THE SAME

RELATED APPLICATIONS

This application claims the benefit of Netherlands Patent Application No. 2034659, filed on Apr. 21, 2023, and which is incorporated by reference herein.

TECHNICAL FIELD

The invention relates to user input device, such as a keyboard. More in particular, the invention relates to a user input device, which comprises a first input element, having a first range of operation, a second input element, having a second range of operation, and an output. The first and second input element are each configured to provide a respective input signal corresponding to a current degree of operation of the respective input element within the range of operation thereof. The user input device further comprises, processing means operatively connected to each of the first and second input element for receiving the respective input signals, and are operatively connected to the output for providing an output signal thereto, the output signal being indicative whether or not each of the first input element and the second input element is activated. The processing means are configured to, for at least one of the first input element and the second input element:
   a) determine that the input element is activated based on the corresponding input signal; and
   b) generate the output signal in accordance with the determined activation.

A user input device as described hereabove is as such known. In particular, reference is made to keyboards marketed by the applicant under the product names WOOTING 60HE and WOOTING TWO HE. Keyboards of this type have been successful to a certain extent, but a desire to further improve the keyboards remains.

In certain situations, such as when the keyboard is used for playing a fast-paced game at a competitive level, a user would like to provide different, or even contradictory inputs in rapid succession. As an example, in some first-person shooters a user may move sideways, which is called strafing. A particularly effective strategy for avoiding hits from opponents is to change the direction of strafing from left to right or vice versa relatively quickly, for instance repeatedly. In PC gaming, the input operation for performing this change in direction of strafing may be for example pressing a key (for instance the A-key) for moving in the one direction (left), followed by pressing another key (for instance the D-key) for moving in the other direction (right).

Video games have systems in place to deal with operation of two keys which by themselves would result in mutually opposing movement, as these user instructions are considered ambiguous. As an example, if keys for strafing left and for strafing right are operated at the same time, a video game may not be able to infer whether the user would like to strafe left or right. Instead, the video game may stop movement, or may allow the player to move in the direction corresponding to the key that was operated first or last, depending on the programming of the game. Resolving a situation like this is called SOCD resolution, for simultaneous opposing cardinal directions (SOCD). SOCD resolution is known to be implemented in different games, running on a system which accepts user inputs from a user input device.

In the above-described situation, where the user would like to change the direction of strafing quickly, the user may at certain moments operate the two relevant keys at the same time, perhaps inadvertently. Whilst the two keys are operated simultaneously, the video game may operate as described above, thereby preventing changing the direction of strafing or stopping strafing altogether, until one of the two keys is no longer operated. At that point, only one key would be operated, and the action desired by the user is unambiguous. The time in which the user would like to strafe in the other direction but cannot due to the video game's behavior when two keys are pressed at the same time, is a delay that puts the user at a disadvantage. This reliance on the SOCD resolution provided by the game is not at all times optimal.

The invention has as its object to at least partially alleviate this disadvantage.

For that purpose, the invention provides a user input device according to the preamble, wherein step a) comprises determining that the input element is activated based also on the input signal corresponding to the other of the first input element and the second input element.

According to the invention, it can for instance be determined whether or not the first input element is activated based on the degree of operation of the first input element and that of the second input element. Accordingly, it becomes possible e.g. to detect situations in which a relatively quick change in direction is desired, and to determine that the first input element is not activated accordingly. In particular, it is possible to determine that the first input element is not activated, i.e. deactivated depending on a degree of operation of the second input element, at a degree of operation of the first input element which is different than a degree of operation at which the first input element would be deactivated if the second input element were not operated or not operated as much.

In other words, if it would normally be determined that the first input element is deactivated at a deactivation threshold, the invention allows determining that the first input element is deactivated even before the deactivation threshold is reached, depending on the degree of operation of the second input element.

The invention may therefore be implemented, although this is not strictly required, as a deactivation threshold for the first input element, wherein the deactivation threshold is based at least partly on the current degree of operation of the second input element (and/or vice versa).

As a non-limiting example, it is possible to determine that the first input element is deactivated as soon as the second input element is operated to a degree that exceeds that of the first input element. Put differently, the deactivation and/or activation of the first input element may be determined by comparing the respective degrees of operation of the first and second input elements.

Of course similar decision making can be applied to the second input element, and optionally even to other input elements of the user input device if they are provided.

It is noted that the invention may be applied to any situation where quickly switching between user input would otherwise be ambiguous or cause undesired results. Nevertheless it is particularly advantageous when applied to keyboards, more specifically to keys of the keyboard that are associated with opposing movements, such as those associated with left and right strafing (A-key and D-key respectively).

The invention stems in part from the realization that currently known SOCD resolution is not in all cases optimal, and can be circumvented by implementing resolution based on the degrees of operation of respective input elements.

Accordingly, the resolution takes place in the analogue domain and can therefore take advantage of the additional information present in the analogue domain. Then, when the resolution has been performed, only one input element may be output as activated, in particular even if otherwise both would be output as activated. Accordingly, normal SOCD resolution does not apply—and is therefore circumvented. There of course remain situations in which resolution in the analogue domain offers no resolve either. For instance in case both input elements are operated equally far, for instance to their maximum range of operation, both input elements may be output. Depending on the software receiving the output from the user input device, normal SOCD resolution may then be applied.

The output signal may comprise digital information on the activation of the input elements, in the sense that it shows either activation of a respective input element, or the opposite, i.e. non-activation of the respective input element. As an example, the output signal may represent a list of all currently activated input elements. In such a case, non-activated input elements would not be in the list. As another example, a full list of input elements may be comprised in the output signal, indicating for each and every input element whether or not it is currently activated. The invention can be applied for both of these examples and possibly others, because in each case it needs to be determined whether or not an input element is activated.

Since the output is either indicative of activation, or of non-activation of a particular input element, it is sufficient to state that the processing means are configured to determine that the input element is activated. Accordingly, if the processing means at some point in time do not determine that the input element is activated, it is inferred that the input element is not activated. The opposite is also true. Accordingly, in some implementations determining whether or not a respective input element is activated is technically synonymous to determining that the input element is activated.

The input signals received from the input elements may correspond to many different degrees of operation within the range of operation of the input elements. In that sense, the indicated by in the input signals is analog. The signals themselves may also be analog. Yet, the indication in the output signal is digital (e.g. representing either activation or non-activation), the user input device, and in particular the processing means, thus performs a particular kind of analog-digital conversion for each of the input elements. As introduced above, the converted digital information may represent, or may be part of, the output signal.

It is however possible to additionally output (i.e. provide output) information about the degree of operation of the input element(s). The output signal may for that purpose comprise information indicative of a current degree of operation of the respective input element(s).

The output signal itself is preferably digital. Various protocols exist for indicating whether or not an input element is activated, some of which will be described in some more detail below. It is noted that further protocols exist to encode a degree of operation—which is analog—in a digital signal, albeit in a discrete i.e. parsed manner having a limited resolution.

The output may be a physical output, such as a plug or a wireless transmitter. In particular, the output is configured for external communication, i.e. for communication with a device outside of the user input device, referred to herein as the controlled device.

The processing means may be embodied on or in the user input device, or in any other location remote from the controlled device. It should therefore be pointed out that it is possible to determine whether or not the input elements are activated on the user input device, or at least remote from the controlled device.

Accordingly, it becomes possible to provide user input to a controlled device following existing standards, whilst the user input itself represents the determination of activation of input elements as disclosed herein.

The first input elements may be user operable, for instance independent from each other.

The determination of activation may be made for each of the first input element and the second input element. Accordingly, the activation of each of the two input elements can be dependent on the current degree of operation of both user input elements.

Accordingly, it becomes possible to switch very quickly between activation of two user input elements, which may be particularly useful if the input elements represent opposing actions, such as instructions for movement in opposite directions.

In a particular embodiment of the invention, step a) comprises determining that the first input element is activated based on a comparison between the input signals respectively corresponding to the first input element and the second input element.

The comparison may be made to conclude which input element is currently considered more important to a user. In case a comparison between the input elements is made, it is possible to switch very quickly between activation of the one input element only and the second input element only, for instance each time the comparison flips, optionally by a certain amount. In general terms, the comparison allows only outputting one input element as active, even though more or both would be considered active had they not been compared as is currently proposed.

In general terms, the comparison may comprise a direct comparison of the degree of operation of the input elements, but may also comprise determining if there is a minimum difference between the two degrees of operation. The minimum difference may be configurable, and may for instance be stored as a parameter in a memory of the user input device connected to the processing means.

By imposing a minimum difference spurious switching between activation and non-activation of one or more input elements may be avoided when the degree of operation of the input elements is approximately equal for a relatively short period of time.

Determining that the first input element is activated based on the comparison may further include an additional step of testing whether or not the input element(s) are fully operated, i.e. operated to the end of their range of operation—fully pressed in case of depressible keys. This test allows distinguishing between a situation in which the respective degrees of operation of two keys is similar because the degree of operation of one input element being released passes that of the other being pressed momentarily, and a situation in which both input elements are deliberately operated equally at the same time.

One or more of a variety of tests may be employed to determine whether the input element(s) are fully operated. As an example, the degree of operation may be determined to a predetermined value indicative of the end of the range of operation of the respective input element. Alternatively, it may be determined that the input element is fully operated, i.e. at the end of its range of operation, if it is activated and its degree of operation does not significantly change during a predetermined amount of time. The latter may be particularly accurate in case the input element is a depressible key, since users are generally not able to partly depress two or more keys to the same degree during a prolonged period of time, whilst they are able to keep the keys still by depressing them completely.

If both keys are fully pressed, the determination of activation may be handled according to known techniques for simultaneous opposing cardinal direction (SOCD) resolution, e.g. on the on the user input device. SOCD resolution techniques include: prioritizing one particular direction, outputting both, prioritizing the first-activated direction, or the last activated direction, etc. The resolution technique applied by the user input device described herein may be configurable, and may for instance be stored in a memory of the user input device connected to the processing means. Alternatively, SOCD resolution may be left to the controlled device, simply by outputting both input elements as activated.

In another embodiment of the user input device, the step of determining that the input element is activated includes, if operation of the second input element is started during operation of the first input element, determining that the first input element is deactivated based on the comparison.

Accordingly, it may be possible to determine that the first input element is deactivated relatively quickly, for instance when the second input element is operated to a larger degree (by a predetermined amount more).

Deactivated herein may be defined as being non-activated, for instance after being activated.

Operation of the input elements typically has a few phases. As an example, reference is made to depressible keys, but this disclosure is not limited thereto. In the example, operation may be started by depressing the key. In more general terms, the degree of operation is increased from no operation, to a slight operation, e.g. an operation corresponding to a relatively small part of the range of operation of the input element. At a certain point a threshold level may be reached, and the input element is considered activated. In terms of the example, the key is considered pressed (i.e. activated) from this threshold onwards. Typically, the threshold is set so that after passing the threshold, the input element may still be operated further and further. Traditionally, the input element would be considered deactivated (non-activated) when the degree of activation falls below the activation threshold again. Of course it is possible the degree of activation varies between the first and second passage of the threshold. In other words, the degree of activation can vary with a certain range beyond the activation threshold, but will still remain activated until it falls below the deactivation threshold. As an example, a key may be pressed beyond the activation threshold and then slow released. As another example, a key may be pressed beyond the activation threshold, be slightly released, but not cross the deactivation threshold, and then be pressed further again, before finally being released entirely thereby passing the deactivation threshold.

Improvements have been made by the applicant by setting a different threshold for the deactivation, e.g. for the release of a depressible key. In particular, the release threshold may be set in relation to the maximum possible degree of operation, the maximum occurred degree of operation since the activation threshold has been passed, or some other way. This technique is called Rapid Trigger technology. Of course it is also possible to define a deactivation threshold that is fixed, but different from the activation threshold.

Rapid Trigger technology allows faster deactivation, since it does not rely on a user completely reducing the degree of operation to below the activation threshold.

The user input device disclosed herein may provide even faster deactivation of an input element, for instance when another input element is operated to a larger degree, in particular when the first input element is being released or being operated to a decreasing degree.

Similarly to determining that an input element may be deactivated based on the comparison, the step of determining that the input element is activated may include, if operation of the first input element is started during operation of the second input element, determining that the first input element is activated based on the comparison.

Accordingly, activation may, for the same reasons as described in relation to the deactivation, be quicker.

As described above, if only the at least one of the first input element and the second input element is operated, the step of determining that the at least one of the first input element and the second input element is activated may comprise determining that the respective input element is activated if the current degree of operation exceeds a predetermined activation threshold.

Further, if only the at least one of the first input element and the second input element is operated, the step of determining that the at least one of the first input element and the second input element is activated may comprise determining that the respective input element is deactivated if the current degree of operation subceeds a predetermined deactivation threshold.

Accordingly, a relatively simple analog to digital conversion can be performed. The activation threshold may be configurable, and may for that purpose be stored in a memory connected to the processing means. The deactivation threshold may be configurable similarly. The deactivation threshold may be equal to the activation threshold, or may be configurable independently. The deactivation threshold may be set in accordance with Rapid Trigger technology as described above.

In yet another embodiment, the processing means are configured to perform steps a) and b) only under a predetermined condition, wherein optionally the predetermined condition is that the first input element and the second input element would both be considered activated based on only their own current degree of operation.

Depending on the predetermined condition, more natural responses may be obtained from the user input device.

In an embodiment of the user input device, the first input element and/or the second input element includes or is at least one sensor, optionally at least one Hall-sensor.

Using a (Hall-)sensor, an input signal may be obtained which represents the degree of operation of the input element. In particular, the input signal may be analog.

It is advantageous if an optionally replaceable body is provided for each input element for a user to engage upon. In particular, the user input device may comprise a depressible key for one or all of the first input element and the second input element, wherein the range of operation and the current degree of operation correspond to the range of depression and the current depression of the respective key. Accordingly, the user input device may be a keyboard.

The user input device may comprise additional user input elements. Steps a) and b) described herein may be performed only for a sub-set of input elements of the input device. In particular, the combinations of input elements for which steps a) and b) as described herein are performed may be configurable, for instance by setting appropriate parameters and storing these in a memory connected to the processing means. Activation of the remaining input elements may be determined based on alternative strategies, e.g. activation and/or deactivation thresholds only, possibly combined with Rapid Trigger technology.

As an example, on a keyboard comprising multiple keys, steps a) and b) may be performed for the combination of keys A and D, but not for the combination of keys S and D. At the same time, steps a) and b) may also be performed for the combination of keys W and S.

The invention also relates to a method of operating a user input device having at least a first input element and a second input element, wherein the first and second input element each provide a respective input signal corresponding to a current degree of operation of the respective input element within a respective range of operation thereof, the method comprising, for at least one of the first input element and the second input element a) determining that the input element is activated based on the corresponding input signal; and
b) generating an output signal in accordance with the determined activation; and
c) outputting the output signal, the method described herein step a) comprises:
determining that the input element is activated based also on the input signal corresponding to the other of the first input element and the second input element.

The method may offer the advantages described in relation to the user input device above, and may use the corresponding device features.

In particular, the method may be a computer implemented method, computer herein being defined as any processing device capable of performing the method. As an example, the method may be performed by a one or more processors, and FPGA, a PCB, etc. which may or may not be part of the user input device.

More specifically, the method may comprise determining that the first input element is activated based on a comparison between the input signals respectively corresponding to the first input element and the second input element.

Moreover the method may comprise, if operation of the second input element is started during operation of the first input element, determining that the first input element is deactivated based on the comparison.

The invention also relates to a computer program product comprising instructions which, when executed by suitable processing means, cause the processing means to carry out the method of any of the preceding method claims. The processing means are preferably that of a user input device, e.g. one as described herein (see e.g. the device claims).

The invention will be further elucidated with reference to the drawings, in which:

FIG. 1 is a flow chart of the operation of a user input device; and

FIGS. 2A-2C are graphs representing a degree of operation of two user input elements over time.

FIG. 1 shows as a flow chart the operation of a user input device. As an example, the operation may include obtaining the current degree of operation $d_A$, $d_B$ for two input elements. The degree of operation may be obtained by receiving respective input signals corresponding to the current degree of operation of each input element. Processing means may be provided for performing the operation described using FIG. 1. Then, as a first step 1 it may be determined for each input element whether or not it is activated based on their current degrees of operation $d_A$, $d_B$. Thus, the first step comprises making a decision, based on the analogue reading from the input elements, to provide a binary output. As a result of the decision, each input element is either considered activated or not activated. Then, using the activation information, it is determined whether or not the two input elements are both activated. If this is not the case, no further action needs to be taken, and the activated input elements can be output 3. For example, an output signal may be generated in accordance with the determined activation. These steps (1, 2, and 3) are by themselves known from the prior art.

According to the current disclosure (see box 11), if both input elements are activated, a decision needs to be made as to which of the activated input elements is actually output as being activated. In a way, the method allows for dissecting ambiguous input (two or more input elements activated) into non-ambiguous output, meaning less input elements or only one input element activated. One way of deciding which input element is to be output as activated in favour of the other, is by comparing the current degrees of activation $d_A$, $d_B$ of the two input elements. A comparison in step 5 is therefore included, and based on the comparison 5, only one of the input elements is output. For example, if the current degree of operation $d_A$ of the first input element is larger than the current degree of operation $d_B$ of the other key, the first input element is output 6 as being activated, whilst the second input element is not, and vice versa 7.

When the current degrees of operation $d_A$, $d_B$ are equal or sufficiently close to each other, different behaviors may be implemented. Therefore, a comparison 4 is first made. If the degrees of operation $d_A$, $d_B$ are not sufficiently close, the input element corresponding to the highest degree of operation $d_A$, $d_B$ is output 5, 6, 7. Otherwise, it is determined at another step 8, whether or not the input elements are both held at the same degree of operation $d_A$, $d_B$ for a longer time, for instance at their maximum degree of operation, or whether they are momentarily close while one is passing the other in terms of their respective degrees of operation $d_A$, $d_B$. In the latter case, it is not advantageous to perform resolution based on the degrees of operation until later. Therefore, any one input element can be output. As an example, the latest output input element may be output 9. If the input elements remain close to each other for a longer time, or are both operated to the end of their ranges of operation, resolution for simultaneous opposing cardinal directions (SOCD) may be applied 10, for instance externally (not on the user input device), optionally by outputting both input elements as activated. Alternatively, SOCD resolution may be performed according to known strategies on the user input device. As an example, based on a setting, one input element may be given priority. Alternatively, the latest operated input element may be given priority.

It is noted that while the flow chart is shown for two input elements, the method as described herein can be extended to any number of input elements, or for any combination of multiple input elements.

FIGS. 2A-2C show graphs having time t on the horizontal axis and the degree of operation d on the vertical axis. The degrees of operation $d_A$, $d_B$ are plotted for two input elements (A and B). $d_A$ is plotted with a solid line and $d_B$ with a dashed line. A threshold T is given at a predetermined value. The graphs illustrate the operation of the current disclosure in more detail. FIGS. 2A and 2B show operation of the user input device according to the current disclosure, whilst FIG. 2C shows operation according to the prior art. In FIGS. 2A and 2C, rapid trigger technology is enabled, and in FIG. 2B it is not.

Section I: both input elements are not yet pressed. Operation of the first input element (A) is started first. Until $d_A$ reaches the threshold, no input element is considered activated.

Figure 1:
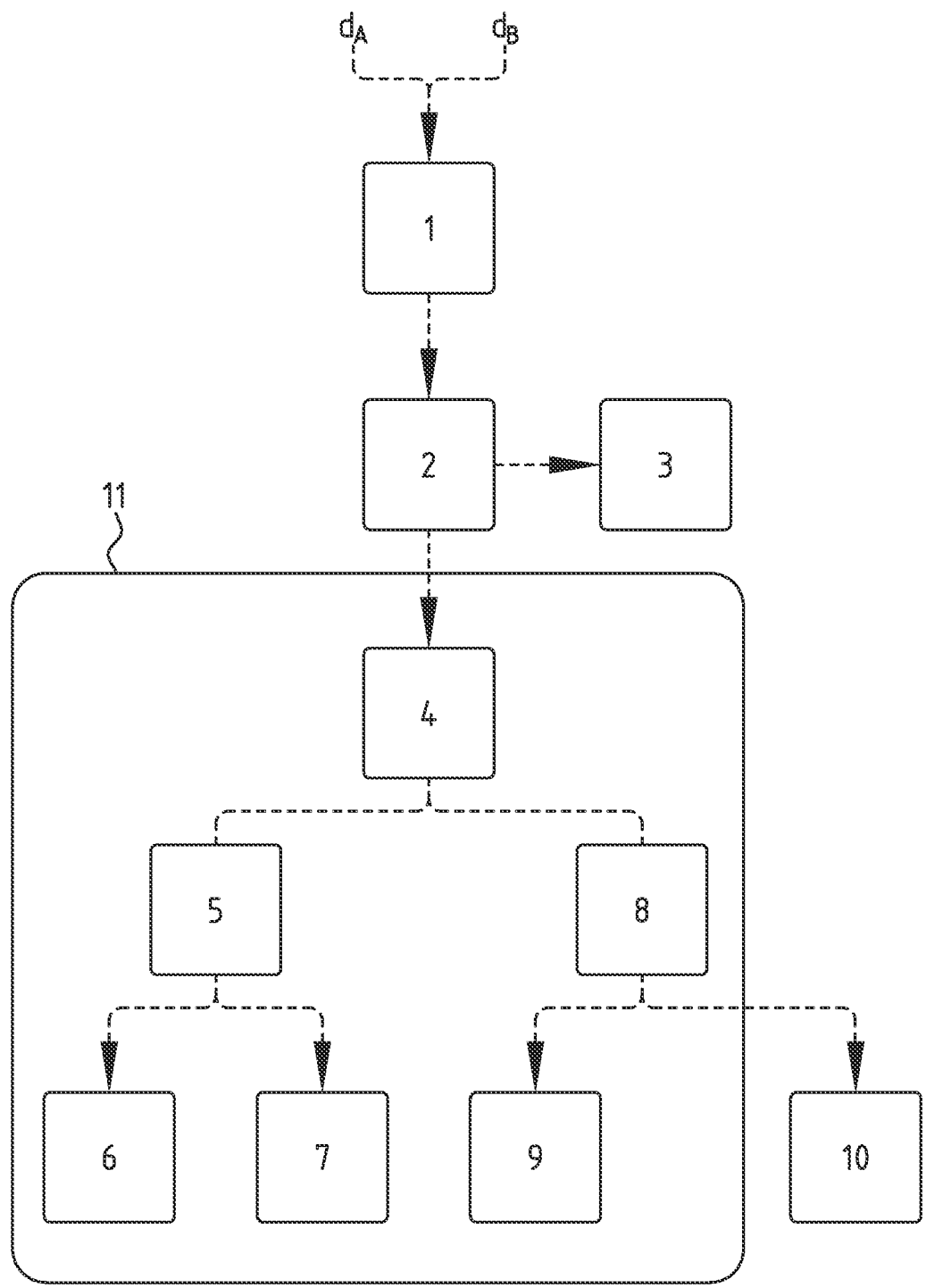
Figure 2A:
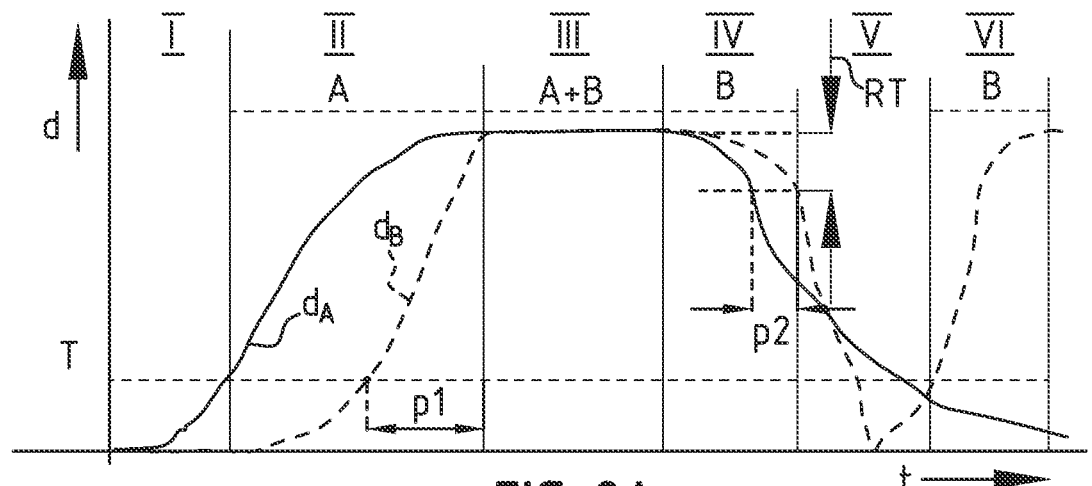
FIG. 2A

Section II: input element A is operated beyond the threshold T, and so it is output as being activated. At first, input element B is not yet operated beyond the threshold T, so no resolution is necessary. Later, during sub-period p1, input element B is also activated beyond the threshold. Since during this period input element A is operated much further than input element B, only input element A is output as being activated. In this case the decision on whether or not input element B is activated is based also on the degree of operation $d_A$ of input element A. the difference with the prior art operation in FIG. 2C can be seen easily during sub-period p1, which overlaps with section III in FIG. 2C. In this section, both A and B are considered activated, as no resolution takes place.

Section III: in section III, both input elements are operated at their maximum degree of operation for a prolonged time. Accordingly, no priority is given to any of the input elements, and they are therefore both output as activated.

Section IV: in section IV, input element A is gradually released. As a result, input element B has a larger degree of operation, so that only input element B is considered activated. Section IV ends when input element B is deactivated a predetermined amount RT. This constitutes the rapid trigger effect, which enables deactivation of the input element even before it has passed below the threshold T. Note that during sub-period p2 input element A is no longer considered activated, so that no resolution is actually necessary. Sub-period p2 in that regard corresponds to section VI of FIG. 2C, since in both situations only element B is considered activated.

Section V: in the following section, both input elements are released beyond their rapid trigger threshold RT, so that no input element is considered activated.

Section VI: only input element B is activated beyond the threshold T, only this input element is considered activated.

FIG. 2B

Figure 2B:
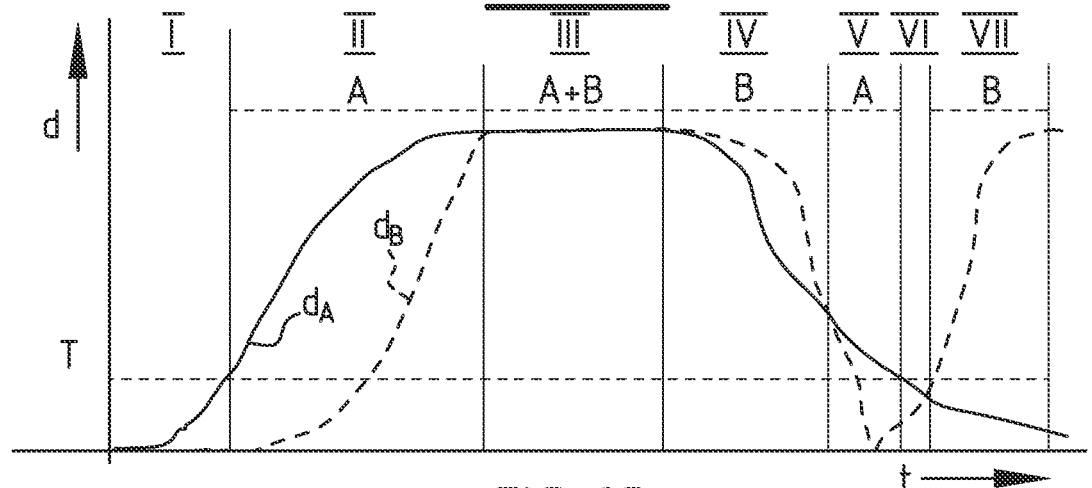
Figure 2C:
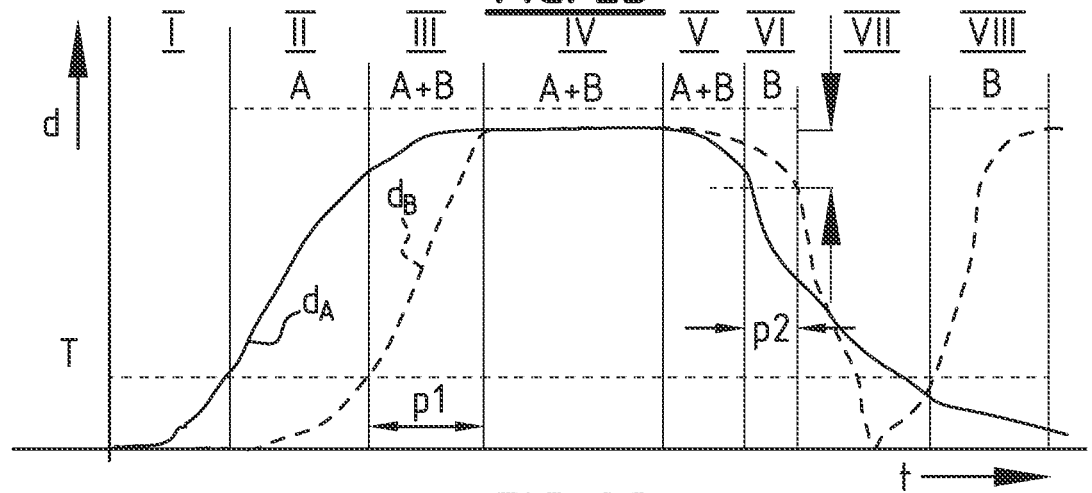

In FIG. 2B, rapid trigger technology is disabled. As compared to the situation in FIG. 2A, differences start to occur at section IV. The earlier sections are therefore not repeated in detail here.

Section IV: as opposed to the situation in FIG. 2A, input elements are only considered deactivated once they are operated below the threshold T. As such, section IV, in which both input elements are above the threshold T, is extended until the degree of operation switches. During section IV, input element B is operated to a larger extent, and therefore according to the current disclosure it is output as the only activated element, even though input element A is above the threshold.

Section V: when input element B is released further than input element A, the degree of operation $d_A$ of element A exceeds that of B. Accordingly, input element A is now output as the only active input element. At some point during section V, the degree of operation $d_B$ of element B falls below the threshold. In that case, no resolution is required, as only input element B is actually considered activated based on the threshold.

Sections VI and VII: the situation in sections VI and VII of FIG. 2B is similar to that of sections V and VI of FIG. 2A.

FIG. 2C

Sections I and II are no different than section I and the beginning of section II of FIG. 2A.

Section III: at section III, both input elements are activated beyond the threshold. Accordingly, they are both output as activated, since no resolution takes place in the prior art. In this case, resolution is left to the device receiving the input. For example, currently known SOCD resolution can take place externally.

Section IV: both input elements are fully operated, and are thus output as being activated.

Section V: both input elements are operated above their threshold, and are thus output as being activated.

Section VI: Rapid trigger technology disables activation of input element A, so that only B is considered activated and output.

Sections VII and VIII: the situation in sections VII and VIII is similar to that in sections V and VI of FIG. 2A.

Although the invention has been described above with reference to specific embodiments and examples, the invention is not limited thereto. In fact, the invention is also described by the attached claims.

What is claimed is:

1. User input device, the user input device comprising:
a first input element, having a first range of operation;
a second input element, having a second range of operation;
an output;
wherein the first and second input elements are analog, and each being configured to provide a respective input signal corresponding to a current degree of operation of the respective input element within the range of operation thereof,
wherein the user input device further comprises:
a processor operatively connected to each of the first and second input elements for receiving the respective input signals, and operatively connected to the output for providing a Boolean output signal thereto, the output signal being indicative of whether or not each of the first input element and the second input element is activated;
wherein the processor is configured to, for at least one of the first input element and the second input element:
a) determine whether or not the respective input element is activated based on the corresponding input signal; and
b) generate the output signal in accordance with the determined activation;
wherein if only the at least one of the first input element and the second input element is operated, the step of determining whether or not the respective input element is activated comprises:
determining that the respective input element is activated if the current degree of operation exceeds a predetermined activation threshold; and
determining that the respective input element is not activated if the current degree of operation falls below a predetermined deactivation threshold,
wherein step a) comprises:
determining that the respective input element is activated based also on the input signal corresponding to the other of the first input element and the second input element, by determining that the respective input element is not activated depending on a degree of operation of the other of the first element and the second input element, at a degree of operation of the respective input element which is different than a degree of operation at which the respective input element would be deactivated if the other of the first input element and the second input element were not operated or not operated as much.

2. User input device according to claim 1, wherein the determination of activation is made for each of the first input element and the second input element.

3. User input device according to claim 1 wherein, step a) comprises:
determining that the first input element is activated based on a comparison between the input signals respectively corresponding to the first input element and the second input element.

4. User input device according to claim 3, wherein the step of determining that the input element is activated includes:
if operation of the second input element is started during operation of the first input element, determining that the first input element is deactivated based on the comparison.

5. User input device according to claim 4, wherein the step of determining that the input element is activated includes:
if operation of the first input element is started during operation of the second input element, determining that the first input element is activated based on the comparison.

6. User input device according to claim 1, wherein the processor is configured to perform steps a) and b) only under a predetermined condition, wherein optionally the predetermined condition is that the first input element and the second input element are both activated.

7. User input device according to claim 1, wherein the first input element and/or the second input element includes or is at least one sensor, optionally at least one Hall-sensor.

8. User input device according to claim 7, wherein the respective input signal is an analogue signal.

9. User input device according to claim 1, further comprising a depressable key for one or all of the first input element and the second input element, wherein the range of operation and the current degree of operation correspond to the range of depression and the current depression of the respective key.

10. User input device according to claim 9, wherein the user input device is a keyboard.

11. A method of operating a user input device having at least a first input element and a second input element, wherein the first and second input elements are analog, and each provides a respective input signal corresponding to a current degree of operation of the respective input element within a respective range of operation thereof,
the method comprising, for at least one of the first input element and the second input element:
a) determining whether or not the respective input element is activated based on the corresponding input signal; and
b) generating a Boolean output signal in accordance with the determined activation; and
c) outputting the output signal,
wherein if only the at least one of the first input element and the second input element is operated, the step of determining whether or not the respective input element is activated comprises:
determining that the respective input element is activated if the current degree of operation exceeds a predetermined activation threshold; and
determining that the respective input element is not activated if the current degree of operation falls below a predetermined deactivation threshold;
wherein step a) comprises:
determining that the respective input element is activated based also on the input signal corresponding to the other of the first input element and the second input element, by determining that the respective input element is not activated depending on a degree of operation of the other of the first element and the second input element, at a degree of operation of the respective input element which is different than a degree of operation at which the respective input element would be deactivated if the other of the first input element and the second input element were not operated or not operated as much.

12. The method according to claim 11, wherein step a) comprises:
determining that the first input element is activated based on a comparison between the input signals respectively corresponding to the first input element and the second input element.

13. The method according to claim 12, comprising:
if operation of the second input element is started during operation of the first input element, determining that the first input element is deactivated based on the comparison.

14. A computer program product and processor, comprising instructions executing on the processor which cause the processor to carry out the method of claim 13.

* * * * *